United States Patent
Oliver

(10) Patent No.: US 9,140,773 B2
(45) Date of Patent: Sep. 22, 2015

(54) MONITORING THE MOVEMENT OF MOBILE COMMUNICATION DEVICES

(75) Inventor: Toby Oliver, Port Way (GB)

(73) Assignee: Path Intelligence Limited, Gosport (GB)

( * ) Notice: Subject to any disclaimer, the term of this patent is extended or adjusted under 35 U.S.C. 154(b) by 666 days.

(21) Appl. No.: 11/658,718

(22) PCT Filed: Jul. 29, 2005

(86) PCT No.: PCT/EP2005/053727
§ 371 (c)(1),
(2), (4) Date: Jan. 29, 2007

(87) PCT Pub. No.: WO2006/010774
PCT Pub. Date: Feb. 2, 2006

(65) Prior Publication Data
US 2008/0318591 A1   Dec. 25, 2008

Related U.S. Application Data

(60) Provisional application No. 60/592,690, filed on Jul. 30, 2004.

(51) Int. Cl.
*G01S 3/46* (2006.01)
*H04W 4/02* (2009.01)
*H04W 64/00* (2009.01)
*H04W 16/24* (2009.01)
(Continued)

(52) U.S. Cl.
CPC ... *G01S 3/46* (2013.01); *G01S 3/48* (2013.01); *G01S 5/04* (2013.01); *H04W 4/021* (2013.01); *H04W 4/028* (2013.01); *H04W 16/24* (2013.01); *H04W 64/00* (2013.01); *H04M 2242/30* (2013.01)

(58) Field of Classification Search
CPC ................ H04W 4/02–4/046; H04W 64/00; H04W 16/24–16/32; H04M 2242/30; H04L 67/24; G01S 3/46; G01S 3/48; G01S 5/04
USPC .................... 342/378; 455/404.2, 456.1–457
See application file for complete search history.

(56) References Cited

U.S. PATENT DOCUMENTS

| | | |
|---|---|---|
| 5,295,064 A | 3/1994 | Malec et al. |
| 5,659,596 A * | 8/1997 | Dunn .................. 455/456.1 |
| 6,246,882 B1 | 6/2001 | Lachance |

(Continued)

FOREIGN PATENT DOCUMENTS

WO   2006/010774 A1   2/2006

OTHER PUBLICATIONS

PCT Search Report Mailed Oct. 5, 2005.
(Continued)

*Primary Examiner* — Larry Sternbane

(57) ABSTRACT

A system records the movement of people carrying mobile devices within a specific area. A plurality of receivers distributed throughout the specified area monitor the area for wireless communication from a mobile device. Mobile devices are identified by way of a unique identifier, e.g. IMSI, IMEI, MAC address, or similar transmitted on a control channel or the like. Whenever such wireless communication is detected, the direction from which the signal is received is detected. The position of the mobile device (and hence the person carrying it) may be calculated by triangulating results from two or more receiving devices, and the results stored.

9 Claims, 5 Drawing Sheets

(51) Int. Cl.
*G01S 3/48* (2006.01)
*G01S 5/04* (2006.01)

(56) References Cited

U.S. PATENT DOCUMENTS

| | | | | |
|---|---|---|---|---|
| 6,459,903 | B1* | 10/2002 | Lee | 455/456.1 |
| 6,463,290 | B1* | 10/2002 | Stilp et al. | 455/456.1 |
| 6,484,035 | B2* | 11/2002 | Allen, Jr. | 455/456.1 |
| 6,650,902 | B1* | 11/2003 | Richton | 455/456.3 |
| 6,716,101 | B1 | 4/2004 | Meadows et al. | |
| 2002/0039904 | A1* | 4/2002 | Anderson | 455/456 |
| 2002/0183077 | A1* | 12/2002 | Fomukong | 455/456 |
| 2003/0016174 | A1* | 1/2003 | Anderson | 342/378 |
| 2003/0134648 | A1* | 7/2003 | Reed et al. | 455/456 |
| 2003/0146871 | A1* | 8/2003 | Karr et al. | 342/457 |
| 2003/0216144 | A1* | 11/2003 | Roese et al. | 455/456.1 |
| 2008/0113672 | A1* | 5/2008 | Karr et al. | 455/456.1 |

OTHER PUBLICATIONS

Examination Report received for European Patent Application No. EP05763979.1, dated Aug. 1, 2007, 7 pages.

International Preliminary Report on Patentability and Written Opinion received for International Patent Application No. PCT/EP2005/053727, dated Jan. 30, 2007, 11 pages.

* cited by examiner

MONITORING THE MOVEMENT OF MOBILE COMMUNICATION DEVICES

BACKGROUND

1. Field of the Invention

This invention relates to a system for monitoring the movement of mobile communication devices, and to a method of monitoring the movement of mobile communication devices.

2. Discussion of Related Art

Currently in areas where large numbers of people congregate it may be advantageous to know the paths people take through the area. However, the mobile telephone network operators can only calculate the position of a mobile device to within several hundred meters unless the people being tracked carry extra equipment. This path information can currently only be accurately gathered manually, which is time consuming, expensive and error prone.

Numerous prior publications address mobile device tracking or monitoring, but all of them require the use of special hardware or software on the mobile device. In the field of shopping, U.S. Pat. No. 5,295,064 outlines a method to track shoppers by adding geolocation hardware to shopping carts, which not only makes the trolleys much more expensive but would be unable to track the shoppers who do not use a shopping cart.

In the more general field of mobile device tracking there are also a number of prior publications, but again they all require some interaction with the mobile device. In U.S. Pat. No. 6,716,101, a paging signal is sent out to a mobile device and its response is used to calculate its position. This not only has the disadvantage of working only with devices that offer such paging facilities, but it also requires the transmitting of the paging signal, which could interfere with other communications. In U.S. Pat. No. 6,246,882, a method of using specialised mobile devices which transmit a position signal is suggested. This will only give a useful indication of the movement of a group of people if significant numbers of people within that group have such specialised devices.

In conclusion no monitoring device previously suggested allows the passive monitoring of peoples' movement, without the defect of requiring the people being monitored to carry specialised or adapted hardware.

SUMMARY OF THE INVENTION

According to a first aspect of the present invention, there is provided a system for monitoring movement, the system comprising a plurality of receiving units distributed over an area, each receiving unit being for receiving and interpreting mobile communication signals, for calculating a direction from which each mobile communication signal is received and for providing data in response thereto, a control unit, and means for communicating the data between the receiving units and the control unit, the control unit being arranged to use the data to determine and record the movement of mobile communication devices within the area.

Preferably, the receiving units are operable to search received signals for an identifier unique to the originating mobile device. The identifier may be an International Mobile Subscriber Identity (IMSI), Temporary International Mobile Subscriber Identity (TIMSI), International Mobile Equipment Identity (IMEI), Medium Access Control (MAC) address or similar.

The control unit may be operable to use data from different receiving units but relating to a common mobile device identifier and relating to signals received within a predetermined window of time to calculate the position of the corresponding mobile device.

Advantageously, the system comprises one or more further receiving units each arranged to monitor basestation transmissions, to derive information relating to expected mobile device transmission therefrom, and to provide this information to one or more of the plurality of receiving units.

According to a second aspect of the invention, there is provided a method of monitoring movement, the method comprising: providing a plurality of receiving units distributed over an area, each receiving unit being for receiving and interpreting mobile communication signals, at each receiving unit: calculating a direction from which each mobile communication signal is received, and providing data in response thereto, communicating the data between the receiving units and a control unit, and at the control unit, using the data to determine and record the movement of mobile communication devices within the area.

The system and method of the invention allow the positions of people to be determined and their movement to be tracked without signals being transmitted from the system or by the method to mobile communication devices being carried. The system and method also does not require people whose positions are being monitored to carry equipment other than their mobile communication devices.

Advantages of the invention will become apparent from a study of the following description and the accompanying drawings.

BRIEF DESCRIPTION OF THE DRAWINGS

Embodiments of the invention are described below, by way of example only, with reference to the accompanying drawings. In the drawings.

DETAILED DESCRIPTION OF EMBODIMENTS OF THE INVENTION

As discussed above, it may be advantageous to know the movements of people within a defined area. For example, in the field of shopping centres, by knowing the movement of people within the centre, the layout of the stores within the centre can be optimised. Further, in the field of mass transit stations, knowing the paths people take within the station can allow improvements in the way people are guided through the station to maximise the flow of people.

Figure 1:
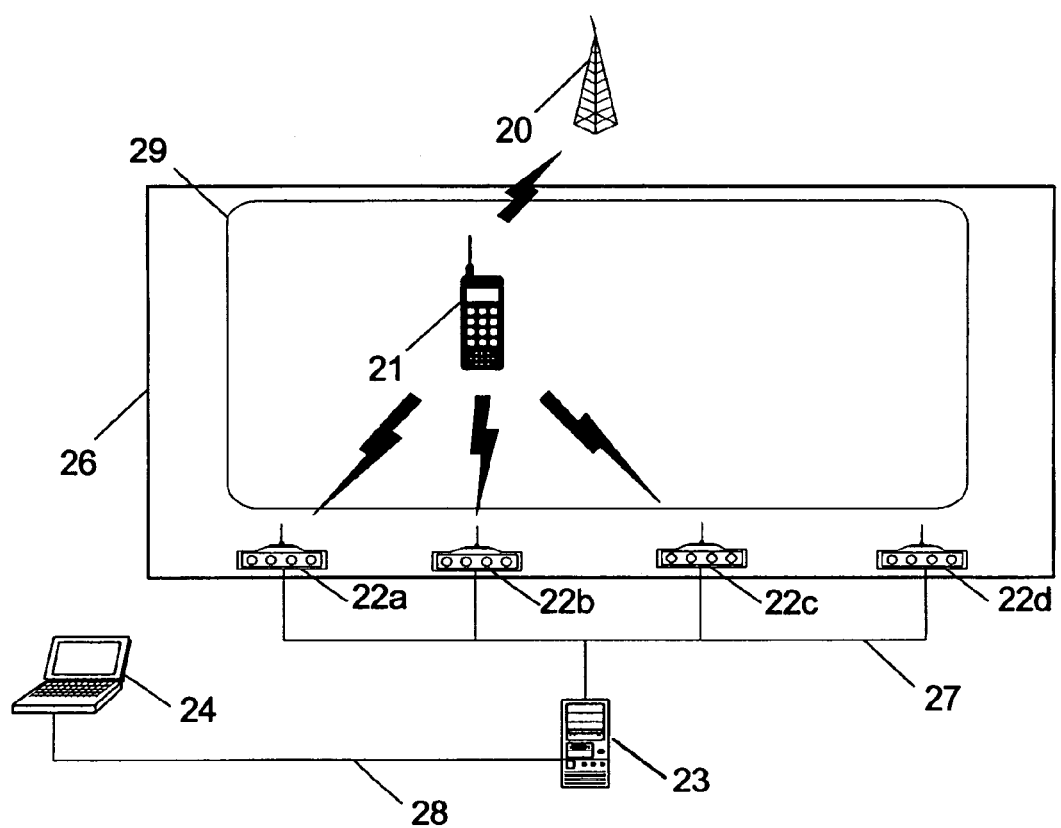
FIG. 1 is a schematic diagram of one embodiment of a tracking system according to aspects of the invention.

Referring to FIG. 1, there is illustrated one example of a system according to the invention. The system includes a wireless basestation 20 (which may also be another type of wireless device and not a basestation) that communicates with one or more mobile devices 21. A main control unit 23 receives data from a plurality of receiving units, 22a-22d via a network connection 27 (which could include but is not limited to Ethernet or wi-fi). The receiving units 22a-22d each monitor a specified area 29 for wireless communication signals. Here, the area from which the receiving units 22a-22d are sensitive to received signals is quite large compared to the spacing between the receiving units. Accordingly, more than one receiving unit 22a-22d is sensitive to signals from any given point, and there is a relatively large area that is covered by all of the receiving units 22a-22d. The main control unit 23, which contains the aggregate data, can be accessed by an external computer 24 via a further network connection 28 (which could include but is not limited to Ethernet or wi-fi).

Receiver units 22a-22d are placed up to 200 meters apart in a pattern throughout the combined coverage area 29, in order to provide complete coverage over the area. Once activated, this plurality of receiver units continually monitors the combined coverage area 29. The plurality of receiver units are capable of receiving all current wireless transmissions from a mobile device 21 to a base station (or other wireless device) 20, including but not limited to Global System for Mobiles (GSM), Code Division Multiple Access (CDMA), Bluetooth and WiFi.

The receiver units 22a-22d search the mobile device 21 originated transmissions for a unique identifier for the mobile device 21 within the lower layers of the communications protocol. This process is detailed in FIG. 3, described below. For example, this unique identifier in GSM could be the mobile device's IMSI, TIMSI or IMEI. For Bluetooth or WiFi, the unique identifier could be the mobile device's MAC address. This unique identifier, along with other information such as the time the communication was detected and the approximate direction of the mobile device from the receiver (calculated from the signal), is sent via the network connection 27 to a main control unit 23. The main control unit 23 combines the data from the receivers 22a-22d for a particular unique identifier and calculates the position of the related mobile device 21 at that instant in time. Preferably, the position calculation involves triangulating the directions of received signals at two or more receiving units 22a-22d, although an approximate position can be determined if only one receiving unit 22a-22d is involved. The main control unit 23 then stores the unique identifier, time of communication and position of the mobile device (this process is detailed in FIG. 4). The main control unit 23 either is pre-informed of the locations of the receiving devices 22a-22d, else this information is transmitted to the control unit 23 by the receiving devices.

The receiving units 22a-22d are synchronised to each other. This helps to ensure that timestamps given to signals received from mobile communication devices are the same for all receiving devices. They may incorporate Global Positioning System (GPS) receivers for this purpose, or may utilise any other source of timing reference. At any time, an external computer 24 can connect via a network 28 to the main control unit 23 to query the stored data and perform further processing on the data.

Figure 2A:
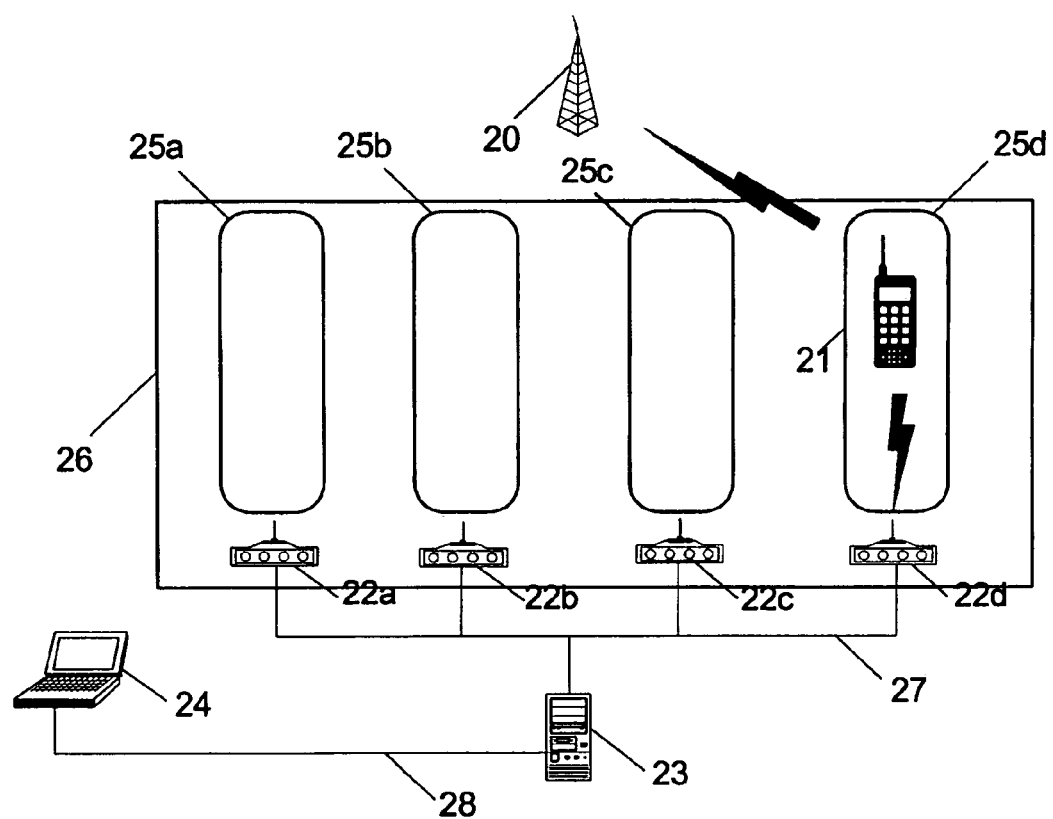
FIG. 2a is the schematic diagram of another embodiment of a tracking system according to aspects of the invention.

Referring to FIG. 2a, there is illustrated a main control unit 23, which receives data from a plurality of receiving units 22a-22d via a network connection 27 (which could include but is not limited to Ethernet or wi-fi). The receiving units 22a-22d monitor a specified area 25a-25d for wireless communications. The main control unit 23, which contains the aggregate data, can be accessed by an external computer 24 via a further network connection 28 (which could include but is not limited to Ethernet or wi-fi).

Receiver units 22a-22d are placed throughout the monitoring area 26 at 100 m or 200 m spacings, to provide monitoring of respective ones of the coverage areas 25a-25d of interest. The receiver units 22a-22d are capable of receiving all current wireless transmissions from a mobile device 21 to a base station (which may also be another type of wireless device and not a basestation) 20, including but not limited to GSM, CDMA, Bluetooth and WiFi. Once activated, this plurality of receiver units continually monitor the combined coverage area 29. Here, the area from which the receiving units 22a-22d are sensitive to received signals is not large compared to the spacing between the receiving units. Instead, the range over which the receiving units 22a-22d are sensitive to received signals may be about equal to two or three times the spacing between the receiving units. Accordingly, most of the positions within the combined coverage area 29 are covered by two of the receiving units 22a-22d, and few positions are covered by only one or by more than two receiving units 22a0-22d.

Figure 2B:
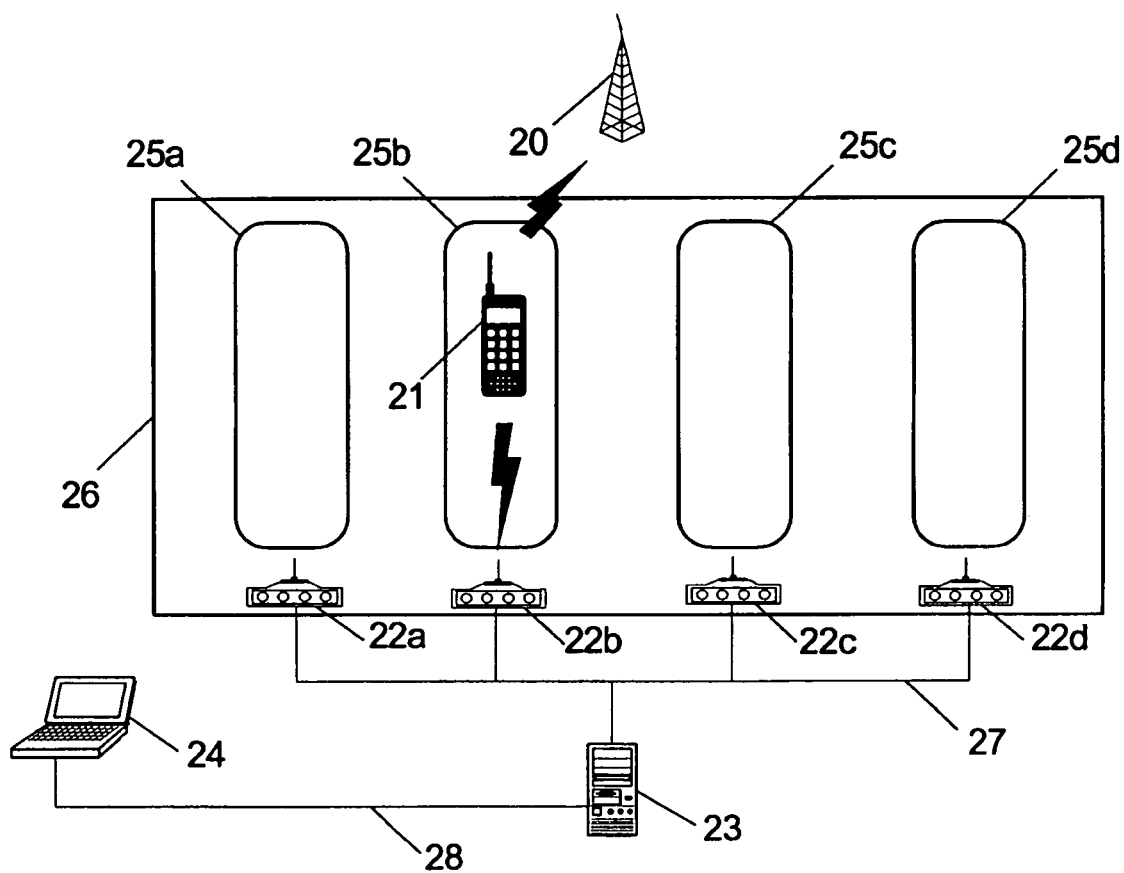
FIG. 2b is a schematic diagram of one embodiment of a tracking system, showing how the mobile device is detected as it moves through the specified area.
Figure 3:
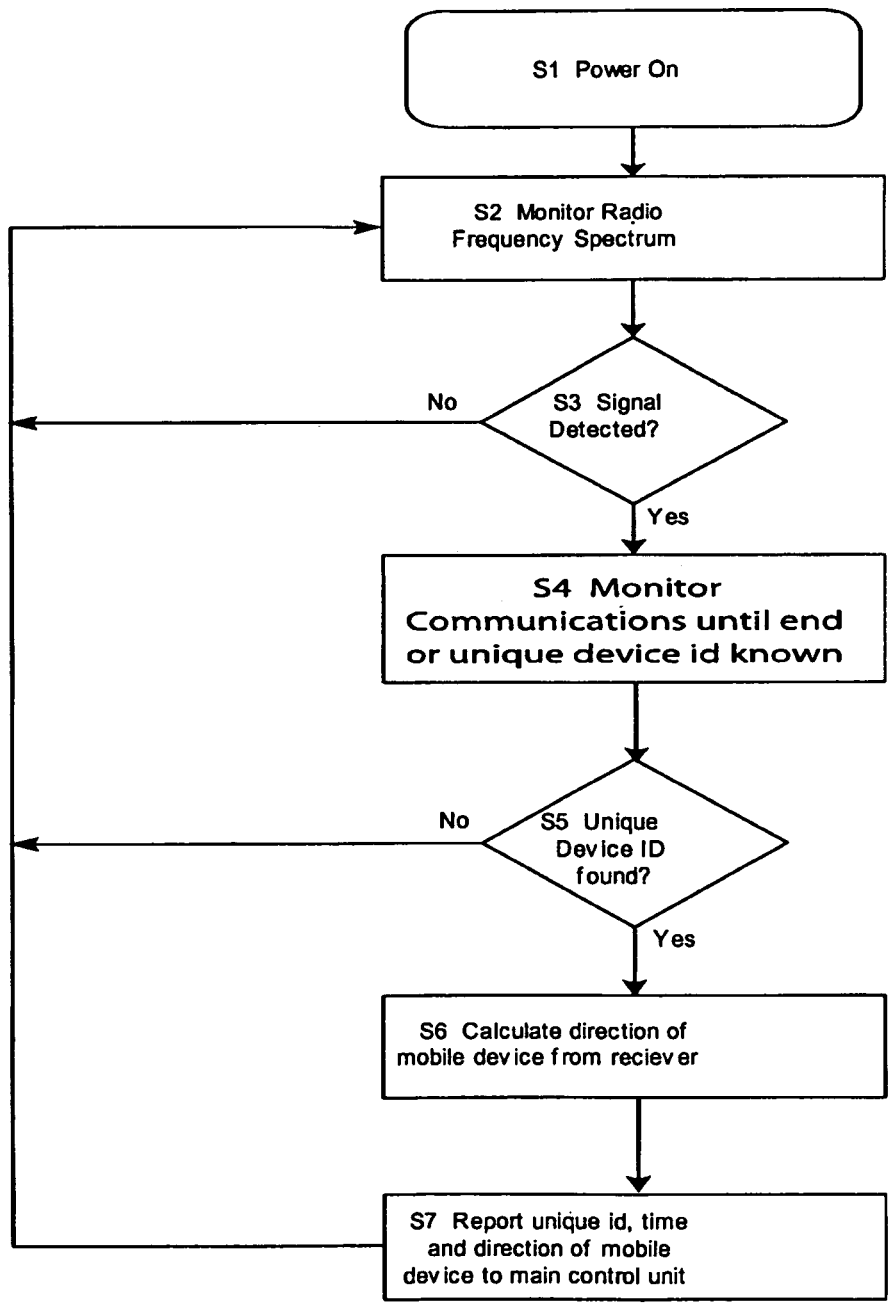
FIG. 3 is a flowchart diagram of one example of receiver operation.

The receiver units 22a-22d search the mobile device 21 originated transmissions for a unique identifier for the mobile device 21 within the lower layers of the communications protocol (this process is detailed in FIG. 3). For example this unique identifier in GSM would be the mobile device's IMSI, TIMSI or IMEI, for Bluetooth or WiFi this would be the mobile device's MAC address. This unique identifier, along with other information such as the time the communication was detected and the approximate direction of the mobile device from the receiver (calculated from the signal), is sent via the network connection 27 to a main control unit 23. The main control unit 23 combines the data from the receiver units 22a-22d for a particular unique identifier and identifies the positions of the mobile device within the total monitoring area 26 using knowledge of the coverage areas 25a-25d the mobile device was communicating in. The main control unit 23 either is pre-informed of the locations of the receiving devices 22a-22d, else this information is transmitted to the control unit 23 by the receiving devices. For example the mobile device 21 in FIG. 2a is in coverage area 25d and then in FIG. 2b the mobile device is in coverage area 25b. Of course, the positions of the mobile devices is determined also by the direction of incidence of signals received at the receiver units 22a-22d, so the resolution of the position measurement is not determined by the size of the coverage areas 25a-25d. Once these positions have been calculated, the main control unit 23 then stores the unique identifier, time of communication and path of the mobile device (this process is detailed in FIG. 4).

The receiving units 22a-22d are synchronised to each other. This helps to ensure that timestamps given to signals received from mobile communication devices are the same for all receiving devices. They may incorporate GPS receivers for this purpose, or may utilise any other source of timing reference. At any time, an external computer 24 can connect via a network 28 to the main control unit 23 to query the stored data and perform further processing on the data as required.

The process of detecting and determining the direction of mobile devices will now be described with reference to FIG. 3.

At step S1, the receiver unit 22a-22d is powered on. At step S2, the receiver unit 22a-22d scans the spectrum which can contain mobile device originated transmissions. These transmissions can include but are not limited to GSM, CDMA, Bluetooth and WiFi communication. If at step S3 a mobile device transmission is detected, it is searched for a unique identifier for the mobile device at step S5. For GSM this unique identifier is the IMSI, TIMSI or IMEI. For Bluetooth or WiFi, this unique identifier is the mobile device's MAC address.

The unique identifier is detected by listening to unciphered or unencrypted messages on the control channel or layer of the relevant communications protocol. For example, in GSM, a base station transmits a paging request message on an unciphered control channel, and the mobile communication device responds with a paging response which includes the TIMSI and which is decodable by stations other than the base station. In this way, no keys or codes beyond the standard ones (which are published in the relevant specifications) are required.

If no signal is found at step S3 or if no unique identifier is found at step S5, the process returns to step S2. If a unique identifier is found at step S5, the direction of mobile device from the receiver unit is calculated at step S6. Then, the unique identifier, the direction of receiving and the time the transmission was detected are sent back to the main control unit 23 at step S7. The process then returns to step S2, where scanning resumes.

The direction of origin of the mobile device signals may be determined in any suitable way. For instance, the direction can be determined through the use of plural radio receivers in each of the receiving units 22a-22d. The signal from the mobile device can be received on all of these radio receivers, and the angle of arrival of the mobile signal can be calculated from the differences in phase of the received signal by the plural radio receivers. Alternatively, each receiving unit 22a-22d could include a phased array of antennas, by way of which the angle of incidence of the received signal can be determined. From this information and the known position and orientation of the receiving device 22a-22d, a relatively thin 'finger' of volume or area in which the mobile communications device is located can be determined.

Figure 4:
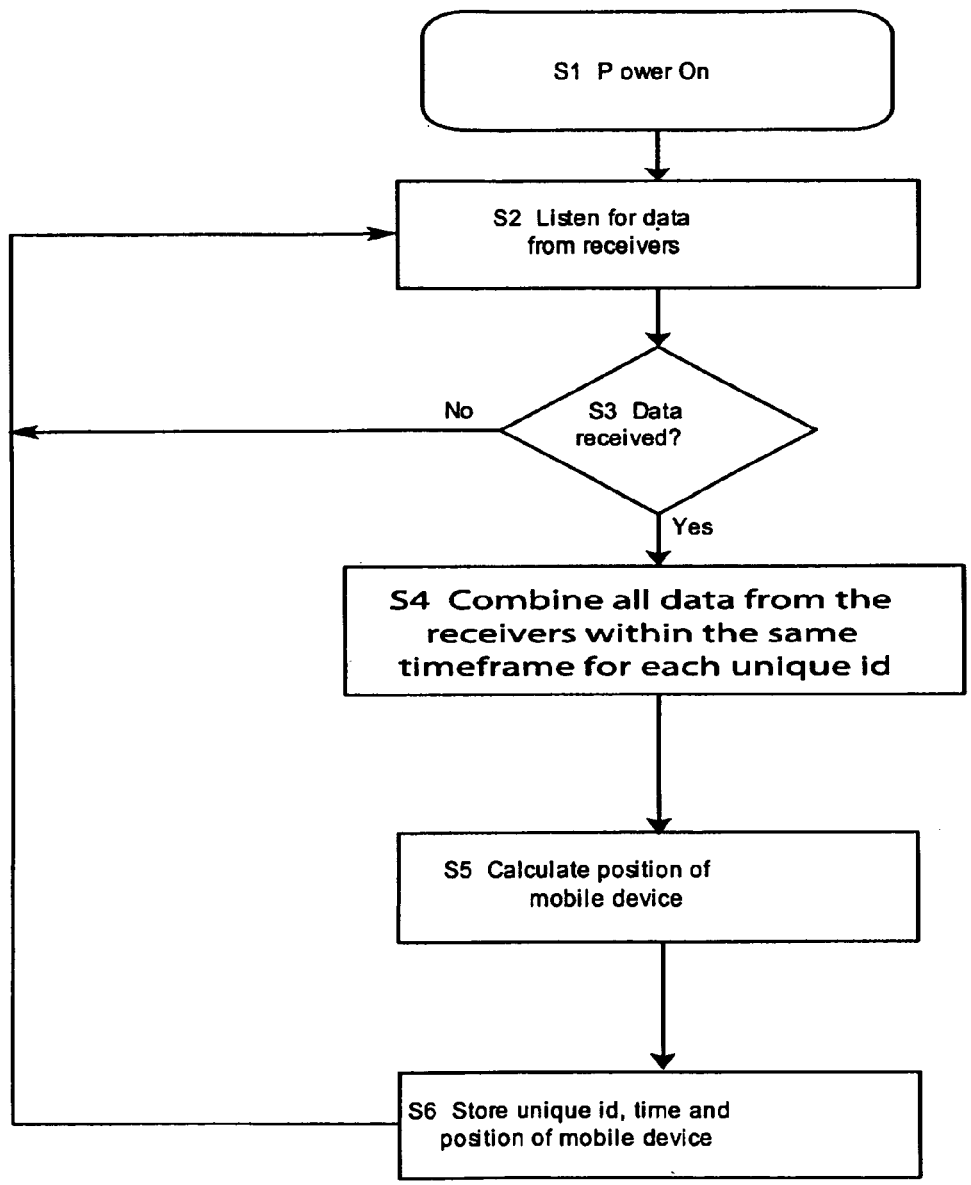
FIG. 4 is a flowchart diagram of one example of a main control unit operation.

Operation of the main control unit 23 will now be described with reference to FIG. 4. FIG. 4 is a flowchart diagram of one example of operation of the main control unit 23.

In FIG. 4, the main control unit 23 is powered on at step S1. At step S2, the main control unit 23 starts to listen for messages from the receiver units 22a-22d. If no messages are received, step S3 yields a negative result and the process returns to step S2.

If a message is received, the process proceeds to step S4. Here, the main control unit 23 combines the newly received message with messages received from other receiving units relating to the same mobile device (i.e. messages containing the same unique identifier which were received by one of the receiving units 22a-22d at approximately the same time). At step S5, the combined data is used to calculate the approximate position of the transmitting mobile device at that instance. This can occur in any suitable way. For instance, signals from a mobile communications device received at two different receiving units 22a-22d at approximately the same time can be triangulated to obtain a reasonably accurate fix of the location of the mobile communications device at that time, although an approximate position can be determined if only one receiving unit 22a-22d is involved. Whether or not the transmissions received from a particular mobile device are sufficiently close together timewise may be determined by determining whether the two times fall within a time window of predetermined width. If this is true, then it is determined that the signals can be used to determine the location. In this instance, the time allocated to the measurement may be the aggregate of the two times. If the times do not fall within the window, then the data is discarded. If there is direction data from only one receiving unit 22a-22d for a particular time, then the location of that mobile communications device will not be able to be determined accurately, although it will be known to be located within a 'finger', which may be sufficient for some applications.

Finally, at step S6, the position and the unique id of the mobile device are stored along with the approximate time the mobile sent its transmission. From plural sets of such data, the movement of the mobile communications device, and thus the person carrying it, can be tracked over time. This information can be useful in tracking movement of people in many scenarios, for instance shopping centres, where people movement determines the shops that they visit and also spending, and in such places as concert and sports venues, to detect overcrowding on particular walkways and the like.

In another embodiment (not shown), two groups of receiving units are provided. Here, one group consists of a plurality of receiving units which monitor basestation transmissions. This provides details (such as time, frequency or code) of the mobile device transmissions which are sent on the control channel or layer. These details are then stored. The other group of receiving units consists are direction finders placed for example up to 200 m apart in a pattern. The pattern is chosen such that mobile device transmissions from a point anywhere within the coverage area can be received by at least two direction-finding receiving units.

In this embodiment, the basestation monitoring units send details of the mobile transmission to the direction-finding receiving station, which then send to the main control unit direction fixes only for the mobile devices for which details were notified by the basestation monitoring units.

Alternatively the basestation monitoring units send the mobile transmission details to the main control unit, and the direction-finding receiving units operate as with the receiving units 22a-22d described above. The main control unit 23 then filters the information provided by the direction-finding receiving units and stores only the information relating to mobile communication devices for which details were provided by the basestation monitoring units.

In all of the above, the receiving units 22a-22d are able to scan the available spectrum for signals from mobile communications devices sufficiently quickly that each device is monitored reasonably frequently. This ensures that the mobile communications devices are detected by at least two different receiving units within a suitably short period of time that a location fix derived from those receiving units is meaningful. If the circumstances are such that this is not possible, then it is advantageous to synchronise the scanning performed by the difference receiving units 22a-22d so that signals from a mobile communications device can be detected by multiple receiving devices within a suitably short period of time.

In summary, the embodiments provide a device to monitor the movement of mobile wireless devices in a specific area is embodied. The device comprises a network of receivers connected to a main control unit. The system may passively track and record the motion of mobile devices (and thus the people who are carrying them) in the coverage area with the minimum of impact on the people being monitored.

The invention as embodied provides an improved crowd movement monitoring tool which can monitor passively without transmitting signals which could cause interference, monitoring a crowd without encumbering members of the crowd with special devices, and recording the path of the people moving in the coverage area.

Having thus described embodiments of the invention and aspects thereof, additional modifications and improvements will be apparent to those of skill in the art. Such modifications and improvements are within the scope of the invention, which is defined only by the appended claims.

What is claimed is:

1. A system for monitoring movement, the system comprising:
a plurality of receiving units, the plurality of receiving units being distributed over an area such that the spacing between the receiving units is between one-third and one-half the range over which the receiving units are sensitive; and
a control unit in communication with each of the plurality of receiving units;
wherein each receiving unit is configured:
to receive and to interpret mobile communication signals transmitted by plural mobile communication devices,
to decode an identifier from a received mobile communication signal,
to calculate a direction from which said mobile communication signal was received,
to record a time at which said mobile communication signal was received, and
to report to the control unit the identifier, the direction and the time relating to the mobile communication signal received from the mobile communication device;
wherein the control unit is configured:
to receive from a first of said plurality of receiving units, a first identifier, a first direction and first time data relating to a first mobile communication signal received from the mobile communication devices,
to receive, from a second of said plurality of receiving units, a second identifier, a second direction and second time data relating to a second mobile communication signals received from mobile communication devices,
if the first identifier is the same as the second identifier, to determine whether the first and second time data fall within a time window of predetermined width,
if the first identifier is the same as the second identifier and the first and second time data fall within a time window of predetermined width, to use the first and second direction data to determine a position of the mobile communication device from which the first and second mobile communication signals were received,
if the first and second time data do not fall within a time window of predetermined width, to discard the data, and
to use the first and second directions and first and second time data to determine and record the movement of the mobile communication devices within the area.

2. A system as claimed in claim 1, in which the identifier is an International Mobile Subscriber Identity (IMSI), Temporary International Mobile Subscriber Identity (TIMSI), International Mobile Equipment Identity (IMEI), Medium Access Control (MAC) address.

3. A system as claimed in claim 1, in which the plurality of receiving units utilise a common source of time.

4. A system as claimed in claim 1, comprising one or more further receiving units each arranged to monitor basestation transmissions, to derive information relating to expected mobile communication device transmission therefrom, and to provide this information to one or more of the plurality of receiving units.

5. A method of monitoring movement, the method comprising:
providing a plurality of receiving units distributed over an area, each receiving unit being configured for receiving mobile communication signals transmitted by plural mobile communication devices and being spaced from other receiving units of the plurality by between one-third and one-half the range over which the receiving units are sensitive; and
providing a control unit in communication with each of the plurality of receiving units,
at one of said plurality of receiving units:
receiving a mobile communication signal from a mobile communication device;
decoding an identifier from the mobile communication signal,
calculating a direction from which said mobile communication signal was received from the mobile communication device,
recording a time at which the mobile communication signal was received, and reporting to the control unit the identifier, the direction and the time relating to the mobile communication signal received from the mobile communication device; and
at the control unit:
receiving, from a first of said plurality of receiving units, a first identifier, a first direction and first time data relating to a first mobile communication signal received from the mobile communication devices,
receiving, from a second of said plurality of receiving units, a second identifier, a second direction and second time data relating to a second mobile communication signal received from mobile communication devices,
if the first identifier is the same as the second identifier, determining whether the first and second time data fall within a time window of predetermined width,
if the first identifier is the same as the second identifier and the first and second time data fall within a time window of predetermined width, using the first and second direction data to determine a position of the mobile communication device from which the first and second mobile communication signals were received,
if the first identifier is the same as the second identifier and the first and second time data do not fall within a time window of predetermined width, discarding the data, and
using the position of the mobile communication device to determine and record movement of the mobile communication devices within the area.

6. A method as claimed in claim 5, in which the identifier is an International Mobile Subscriber Identity (IMSI), Temporary International Mobile Subscriber Identity (TIMSI), International Mobile Equipment Identity (IMEI), Medium Access Control (MAC) address.

7. A method as claimed in claim 5, further comprising operating the receiving units to utilise a common source of time.

8. A method as claimed in claim 5, further comprising operating one or more further receiving units to monitor basestation transmissions, to derive information relating to expected mobile communication device transmission therefrom, and to provide this information to one or more of the plurality of receiving units.

9. A system for monitoring movement, the system comprising:
- a plurality of receiving units, the plurality of receiving units being distributed over an area such that the spacing between the receiving units is between one-third and one-half the range over which the receiving units are sensitive; and
- a control unit in communication with each of the plurality of receiving units;
- wherein each receiving unit is configured:
  - to receive and to interpret mobile communication signals transmitted by plural mobile communication devices,
  - to decode an identifier from a received mobile communication signal,
  - to calculate a direction from which said mobile communication signal was received,
  - to record a time at which said mobile communication signal was received, and
  - to report to the control unit the identifier, the direction and the time relating to the mobile communication signal received from the mobile communication device;
- wherein the control unit is configured:
  - to receive identifier, direction and time data relating to mobile communication signals received from mobile communication devices from each of said plurality of receiving units,
  - for data received from two different receiving units and including the same identifier, to determine whether the time data from the two different receiving units and corresponding to the same identifier fall within a time window of predetermined width,
  - if the time data from the two different receiving units and corresponding to the same identifier do fall within a time window of predetermined width, to use the direction data corresponding to the time data to determine a position of the mobile communication device from which the corresponding mobile communication signals were received,
  - if the time data from the two different receiving units and corresponding to the same identifier do not fall within a time window of predetermined width, to discard the data, and
  - to use the data to determine and record the movement of the mobile communication devices within the area.

* * * * *